United States Patent [19]
Palace

[11] Patent Number: 5,141,369
[45] Date of Patent: Aug. 25, 1992

[54] CUTTING TOOL FOR PLASTIC MATERIALS

[76] Inventor: Hilard F. Palace, 5000 N. New England, Chicago, Ill. 60656

[21] Appl. No.: 397,324

[22] Filed: Aug. 22, 1989

Related U.S. Application Data

[63] Continuation of Ser. No. 219,787, Jul. 18, 1988, abandoned.

[51] Int. Cl.⁵ .............................................. B23B 51/02
[52] U.S. Cl. ........................................ 408/230; 407/54
[58] Field of Search ................. 408/230, 202; 407/54, 407/53

[56] References Cited

U.S. PATENT DOCUMENTS 2,009,168  7/1935  Dettmer ............................ 408/201

FOREIGN PATENT DOCUMENTS 3124104  1/1983  Fed. Rep. of Germany ...... 408/145

OTHER PUBLICATIONS

*Drilling Technology,* Krar and Oswald, 1977, pp. 32,33 and 45.
*Machine Tool Operation,* Burghardt, Axelrod and Anderson, 1959, p. 181.
Morse Catalog No. 75, Set No. 30, p. 76, 1943.

Primary Examiner—Larry I. Schwartz
Assistant Examiner—Lloyd Schultz
Attorney, Agent, or Firm—Kinzer, Plyer, Dorn McEachran & Jambor

[57] ABSTRACT

A cutting tool such as a body drill has a cylindrical shank portion and a body section connected to the shank portion. The twist section terminates at a cutting end. A pair of flutes are formed in the body section, defining a land therebetween. The land includes a narrow margin having a width between 0.015 and 0.025 inches. The land also has a body clearance of a diameter less than that of the margins. The flutes terminate at flute faces at the cutting end. The flute faces are disposed parallel to each other at a zero degree rake angle. The narrow margin aspect of the invention could also be applied to a counterbore or spotface.

11 Claims, 1 Drawing Sheet

CUTTING TOOL FOR PLASTIC MATERIALS

This is a continuation of copending application Ser. No. 07/219,787 filed on Jul. 18, 1988 and now abandoned.

SUMMARY OF THE INVENTION

This invention relates to cutting tools, such as twist drills, counterbores and spotfaces, for use in drilling plastic or hard rubber materials.

It has been found that standard high speed steel drills are unsuitable for use in drilling plastic. Standard drills produce rough holes with a great deal of resistance to drill penetration. This results in a longer drilling time. Also, with the standard configuration on the cutting edge, there is a tendency to grab and chip the edge of the material as the drill exits the back side of the work piece. Standard drills also create a great deal of heat with resulting damage not only to the work piece but also to the drill itself.

The twist drill of the present invention alleviates these problems. It has been found to be suitable for use with a wide range of materials such as acetate, HDPE, nylon, phenolics, polyethylene, polypropylene, polystyrene, PVC, PTFE and hard rubber. The drill can be used for drilling plastic sheets, rod or tubing. It is suitable for drilling hole depths of just fractions of an inch or several inches.

The drill has a body connected to the usual shank portion. The body has double flutes which define a land therebetween. The land includes a narrow margin having a width between 0.015 and 0.025 inches. The land also has a body clearance of a diameter less than that of the margins. The flutes terminate at a cutting end, defining flute faces. The flute faces are parallel to one another and to the longitudinal axis of the drill. The flute faces are disposed at a rake angle of zero degrees.

The use of a relatively narrow margin has also been found effective in counterbores or spotfaces. The counterbores could, have either a straight or tapered shank. A zero degree rake angle is preferred for counterbores used on acrylics. A positive rake is generally used on phenolics although the zero degree rake can also be used on phenolics without any difficulty.

DETAILED DESCRIPTION OF THE INVENTION

Figure 1:
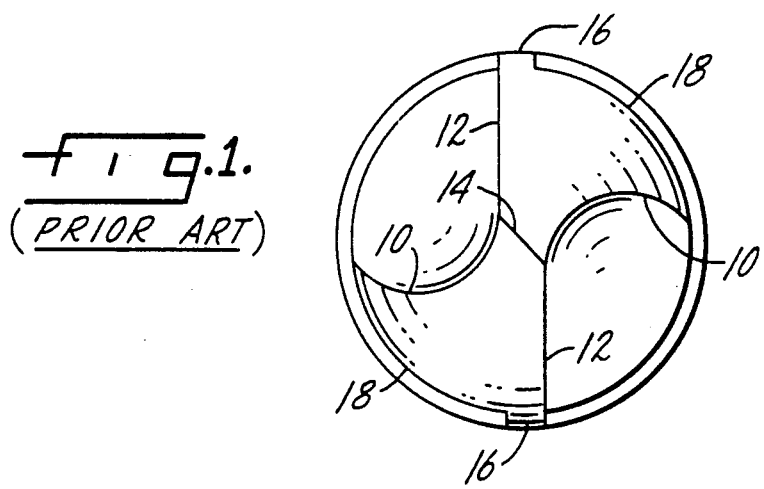
FIG. 1 is an end view of a prior art drill, showing the cutting end of the drill.

FIG. 1 illustrates the cutting end of a standard high speed steel drill as it is commonly configured for drilling metal. The drill has flutes 10 which terminate at cutting edges 12. The cutting edges are disposed at a positive rake angle. A web 14 is formed at the center of the drill. Margins 16 are formed at one boundary of the flutes 10. The margins are relatively wide, being something on the order of a sixteenth of an inch or more on a half inch drill. The margins are adjoined by relief surfaces 18. The relief surfaces are also known as body clearances. While this configuration may be suitable for use in metal, it has been found to produce unsatisfactory results in plastic materials.

Figure 2:
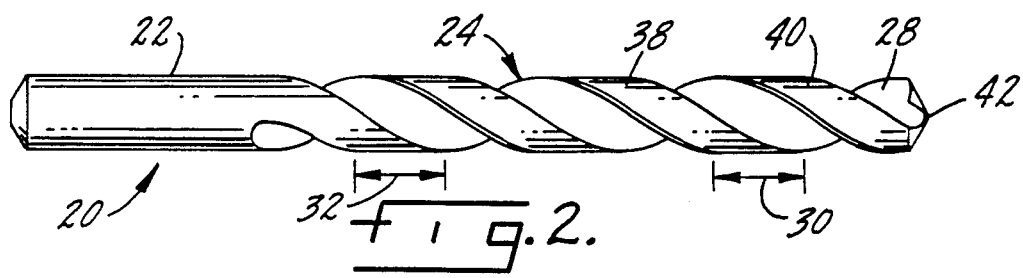
FIG. 2 is a side view of the twist drill of the present invention.
Figures 3, 4:
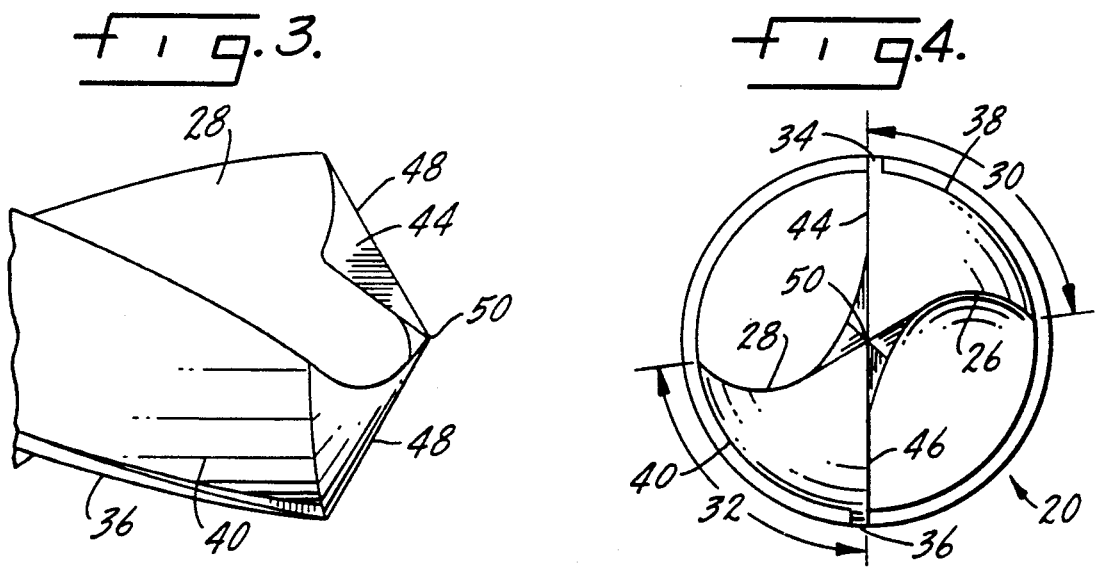
FIG. 3 is an enlarged side view of the cutting end of the drill.
FIG. 4 is an enlarged end view of the drill.

The drill of the present invention is shown at 20 in FIGS. 2-4. It is specifically configured for use in drilling plastic materials. The drill has a cylindrical shank portion 22 connected to a body portion 24. The body portion has a pair of spiral flutes 26, 28 formed therein. The flutes are bounded by lands 30, 32. Each land has a margin 34, 36 and a body clearance 38, 40. As can be seen in FIG. 2, the margin is a portion of the land which is upraised compared to the body clearance.

The body portion terminates at a cutting end 42. The flutes 26, 28 terminate at the cutting end 42 in flute faces 44, 46. The outer edge of the flute faces defines the cutting edges as at 48 in FIG. 3.

There are several significant features of the twist drill. The width of the margins 34, 36 has been reduced from that in the prior art drill. Specifically, the margins have a width between 0.015 and 0.025 inches. This significantly reduces the surface area of the drill in contact with the hole, with the attendant benefits described above. Corresponding to the decreased width of the margins is a increased arcuate dimension of the body clearances 38, 40.

The term "width" is used to describe the outer circumferential dimension of the margins. While the margins are theoretically cylindrical and the outer edge is a segment of a circle, the segment is so small that, as a practical matter, it can be thought of as being straight rather than curved. Thus, the term "width" has been used to describe the outer arcuate dimension of the margins.

The flute faces 44 and 46 are disposed at a zero degree rake angle. This contrasts with the positive rake angle of the drill in the prior art. Further, the flute faces are parallel to one another and to the axis of the drill. The flute faces are disposed along a common diameter. As a result, the center of the cutting end is effectively a point. This is shown at 50 in FIG. 3. This contrasts with the measurable width of the web 14 in the prior art drill.

Figure 5:
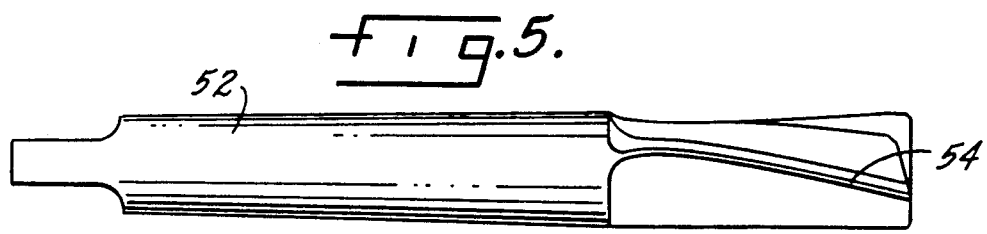
FIG. 5 is a side view of a counterbore according to the present invention.

FIG. 5 shows a facing tool 52 according to the present invention. The facing tool has a generally conventional configuration except for the margin 54. The width of margin 54 has been reduced from the usual 0.125 to 0.1875 inches to between 0.015 and 0.025 inches. This produces the same benefits that attach to the narrow margin as used on the twist drill.

The cutting tool of the present invention achieves faster penetration and less resistance, giving clean, smooth holes. The tool does not grab and chip the work material on the back side as it exits the hole. This produces clean edges on both sides of the work piece. Clean, accurate holes are obtained without overheating the tool or the material. The twist drill of the present invention is free cutting, compared to a standard drill. By free cutting, it is meant that the drill allows much less pressure to be applied to the drill during a cutting operation. The design of the tool eliminates excess buildup of material on the tool and therefore eliminates binding and excess heat. The design is suitable for use in high speed steel tools or carbide tools.

Whereas a preferred form of the invention has been shown and described, it will be realized that modifications may be made thereto without departing from the scope of the following claims.

I claim:

1. A twist drill for drilling plastic material, comprising a shank portion, a body portion connected to the shank portion and terminating at a cutting end, the body portion having at least one spiral flute formed therein, the flute being bounded by a land, the land including a margin of a width between 0.015 and 0.025 inches and a body clearance having a diameter less than that of the margin.

2. The twist drill of claim 1 wherein the flute defines a flute face at the cutting end of the drill, the flute face being disposed at a zero degree rake angle.

3. The twist drill of claim 1 wherein there are two flutes, each defining a flute face at the cutting end of the drill, the flute faces being disposed parallel to each other and at zero degree rake angles.

4. The twist drill of claim 3 wherein the flute faces extend along the same diameter of the twist drill, with the web of the cutting end being substantially a single point.

5. The twist drill of claim 1 wherein the margin is located adjacent the flute, at one edge of the body clearance.

6. A cutting tool for cutting plastic material, comprising a shank portion, a body portion connected to the shank portion and terminating at a cutting face, the body portion having at least one spiral flute formed therein, the at least one flute being bounded by a margin of a width between 0.015 and 0.025 inches.

7. The cutting tool of claim 6 wherein the tool is a facing tool.

8. A method of drilling plastic materials, comprising the steps of:
   providing a twist drill having a shank portion, a body portion connected to the shank portion and terminating at a cutting end, the body portion having at least one spiral flute formed therein, the flute being bounded by a land, the land including a margin of a width between 0.015 and 0.025 inches and a body clearance having a diameter less than that of the land; and
   using said twist drill to drill plastic materials.

9. The method of claim 8 wherein the flute defines a flute face at the cutting end of the drill and further including the step of providing a flute face disposed at a zero degree rake angle.

10. The method of claim 8 wherein two flutes are provided, each flute defining a flute face at the cutting end of the drill and further including the step of providing flute faces which are disposed parallel to each other and at zero degree rake angles.

11. The method of claim 10 further comprising the step of providing the two flute faces extending along the same diameter of the twist drill, with the web of the cutting end being substantially a single point.

* * * * *